Patented Dec. 12, 1922.

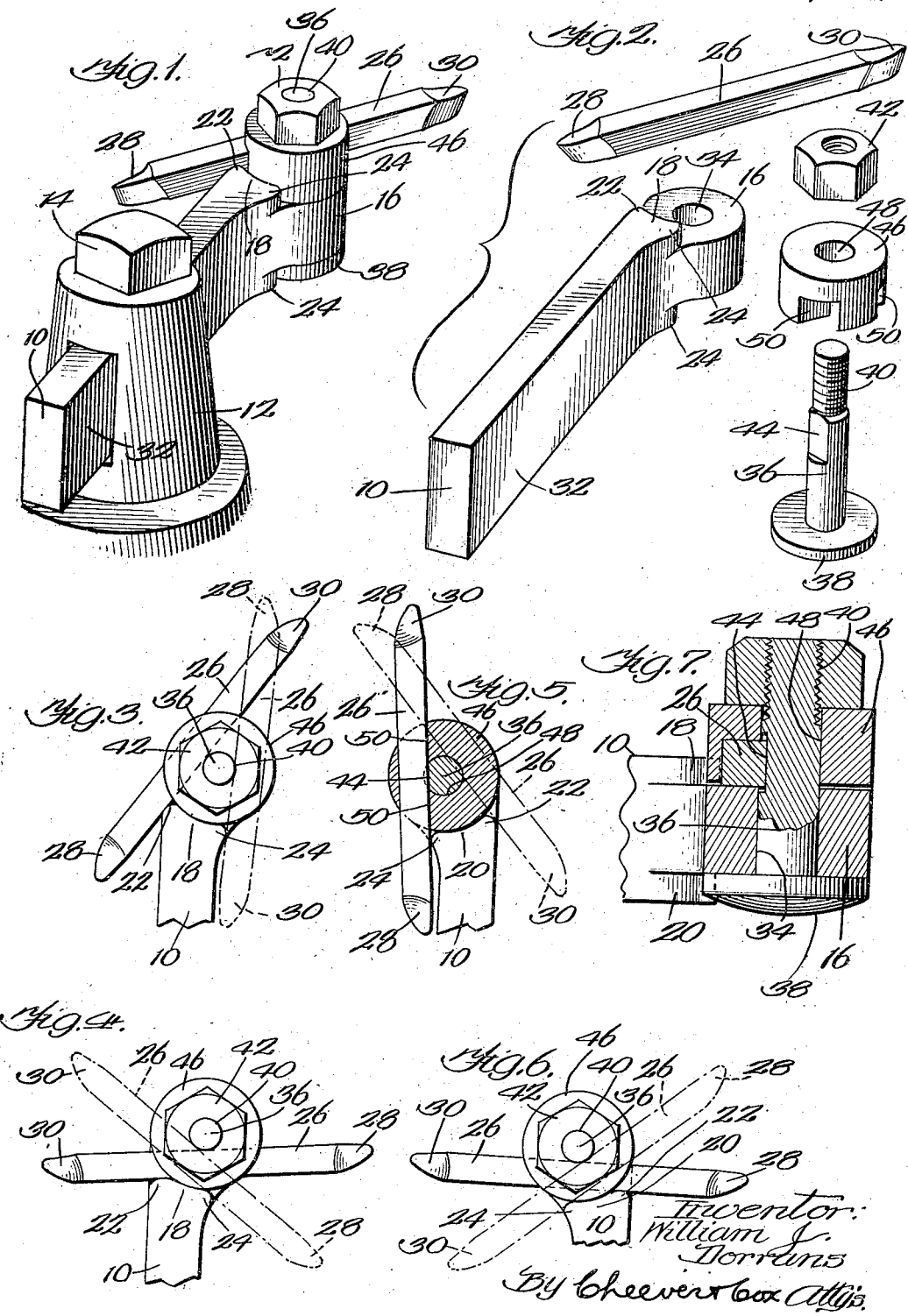

1,438,368

UNITED STATES PATENT OFFICE.

WILLIAM J. DORRANS, OF CHICAGO, ILLINOIS.

TOOL HOLDER.

Application filed February 13, 1922. Serial No. 535,975.

*To all whom it may concern:*

Be it known that I, WILLIAM J. DORRANS, a citizen of the United States, residing at Chicago, in the county of Cook and State of Illinois, have invented a certain new and useful Improvement in Tool Holders, of which the following is a specification.

This invention relates to that type of tool holders used in connection with metal working machines, such as planers, boring machines and the like, employing a normally rigidly supported tool which must be capable of adjustment to various positions required in different classes of work and in different lines of cut.

The object of the invention is to provide a tool of this class of very few parts, which may be readily and quickly adjusted to rigidly support the actual cutting tool in a great many, in the particular case here illustrated eight, different positions, ready for effective work.

The invention consists in means for attaining the foregoing objects, which can be easily and cheaply made, which is satisfactory in use and which is not readily liable to get out of order. More particularly the invention consists in numerous features and details of construction which will be hereafter more fully set forth in the specification and claims.

Refering to the drawings, in which like numerals designate the same parts throughout the several views—

Figure 1 is a perspective view of mechanism of this invention mounted on the tool post or support of the machine on which it is to be used;

Figure 2 is a perspective view of the parts entering into the tool of this invention shown in Figure 1, separated one from another;

Figure 3 is a plan view of the mechanism of Figure 1, showing in dotted lines a changed position view of the small cutting tool;

Figure 4 shows the main tool support in the same position as Figure 3, carrying the supplemental cutting tool in two different changed positions, one shown in full lines and the other in dotted lines;

Figure 5 shows the main cutting tool support turned completely over from the position shown in Figures 3 and 4, thereby giving the supplemental cutting tool four additional cutting positions;

Figure 6 shows the supplemental tool, the securing bolt and rotatable tool holding head, being in the same position as in Figures 1 and 7, the main tool holding shank, however, having been turned completely over before the parts were put together; and Figure 7 is a vertical sectional detail view on the line 7—7 of Figure 4.

In constructing the mechanism of this invention, the operator provides a main tool holder shank 10, preferably a metallic bar of rectangular cross section, of the general type shown in the drawing. This main tool shank is of suitable size and proportions to be inserted in a tool holding head 12 belonging to the machine on which the device is to operate, this head being provided with conventional means such as the screw 14 for detachably securing the shank 10 in various adjusted longitudinal positions with reference to the holder 12. While the device might be cast or otherwise formed without departing from this invention, the simplest practice is for the operator to heat the working or upper end of this tool shank 10, as it appears in Figures 1 and 2, and while hot, upset it in conventional manner to form a generally circular head 16 located between two parallel shoulders 18 and 20 which have on or adjacent to opposite side edges of the shank 10 angular bearing points 22 and 24 adapted to be selectively engaged by the shank of the supplemental working tool 26 having its opposite ends conventionally provided with suitable cutting or other working points 28 and 30.

In the process of forming the head 16, it is, as shown, swung slightly to one side of the central longitudinal axis of the tool shank 10 and in so doing the bearing points 24 on the shoulders 18 and 20 are preferably but not necessarily, carried slightly outside the plane of the adjacent side face 32 of the shank 10.

The head 16 is provided with a central perforation 34 located as shown in the drawing substantially equal radial distances from the angular points 22 and 24 heretofore referred to. As this central perforation 34 is necesarily outside of the plane of the central axis of the shank 10, and in the plane of side faces 32 heretofore referred to and as the angular points 22 and 24 are equally distant from the center of perforation 34, it necessarily follows that, as clearly shown in the drawings, the angular points 22 and 24 are located at different longitudinal positions at the opposite sides of the shank 10, this to assist in varying the number of possible different angular positions of the working tool device 26, as will more fully appear hereafter.

A bolt 36, provided at one end with a head 38 and at the other end with screw threads 40 for the reception of a locking nut 42, is provided, adapted to ready insertion in the perforation 34 in the head 16. This bolt can be inserted interchangeably in either direction with the head 38 adjacent to the shoulder 18 or adjacent to the shoulder 20 of the shank 10, as may be desired.

That portion of the bolt 36 which extends beyond the head 16 when the bolt is in place is preferably provided with a non-circular portion 44 adapted to be engaged by an adjacent flat side of the shank of the cutting tool 26, when the parts are assembled, as shown in Figures 1, 5, etc. A rotatable tool holding head 46 having a central perforation 48 for the reception of bolt 36 is provided, there being in the bottom of the head, as viewed in Figures 2 and 7, a transverse notch 50, which permits this head to be placed over the bolt while the working tool 26 is in contact with non-circular portion 44 of the bolt 36, thereby when the nut 42 has been applied to the bolt, securely fastening the working tool 26 to the bolt so that the bolt and tool 26 are forced to rotate in unison. The position of the transverse opening 50 is such that the working tool 26 may be positioned, as shown in Figures 4 and 6, intermediate of the bearing points 22 and 24, and the center of bolt 36, and rocked between the dotted and full line positions of Figures 4 and 6, or the parts may be positioned as shown in Figures 1, 3 and 5, in which the working tool 26 has to swing through approximately three hundred degrees about the central axis of bolt 36, in order to get from the position in which the shank of the supplemental cutting tool touches bearing point 22 to the position where it touches bearing point 24. Due to this construction, it is possible while the main tool shank 10 is in a given upright position, to move the working tool to each of the four selected positions shown in Figures 3 and 4 and that by simply reversing the tool shank 10 with tool mechanism attached, to the position of Figures 5 and 6, the four other positions there shown may be obtained. So far as the operation heretofore described is concerned, it is necessary to use only one shoulder 18 and the bearing points 22 and 24 adjacent thereto. Just as many more different combinations of positions for the tool member 26 may be obtained by taking out the bolt mechanism and applying the tool in conjunction with the angular points 22 and 24 of shoulder 20, these new positions differing, however, from the first set of positions only in that they are spaced from said original positions a distance equal to the vertical thickness of the head 16.

Attention is called to the fact that the tool holding head 46 retains the shank of the cutting tool 26 at a point eccentric of the bolt 36, a fact which materially aids in increasing the number of possible positions obtainable by the use of the device.

When the operator has, by trial or otherwise, determined which one of the selectable positions shown he desires to use for the practical operation of the tool member 26, he swings the tool member to that position, first loosening the nut 42, if necessary, to permit the swinging, and when the adjustment has been made, he tightens the nut 42 to firmly secure the parts in the selected position. The mechanism described is, however, meritorious in that this gripping of the nut 42 is not relied upon to hold the working tool 26 in position during cutting or other operations, this desired holding being in fact obtained by the engagement of the side of the working tool 26 on the adjacent end bearing point 22 or 24, as the case may be, which is on the opposite side of the bolt 36 from the point 30 or 28, as the case may be, which is actually doing the work. In other words, when the tool 24 is doing actual work, the shank of the tool is a lever of the first class pivoted about the bolt 36, the cutting end of the tool being one effective end of the lever and the end bearing point 22 or 24 engaged by the side of the tool shank being the other bearing point end of the lever.

The number of possible combinations of working positions of the tool mechanism may be increased by adjusting the main tool shank in the support 12 but this does not enter into the invention, the main object being to provide the unitary tool structure described, which is within itself capable of affording a large number of tool positions, each of which is rigidly locked by the engagement of the side of the tool member 26 with an adjacent bearing point 22 or 24.

What I claim is:

1. In a device of the class described, a main tool holder shank, a supplemental working tool carryable by said main tool shank, means pivoting the supplemental tool at a point to one side of the longitudinal center of the main tool shank, and a plurality of tool engageable bearing points irregularly positioned on the main tool shank adapted to be selectively engaged by the side of the supplemental tool to brace it in its work.

2. In a device of the class described, a main tool holder shank, a supplemental working tool carryable by said main tool shank, means pivoting the supplemental tool at a point to one side of the longitudinal center of the main tool shank, and a tool engageable bearing point on each side of the tool shank at different distances along the length of the shank adapted to be selectively engaged by the side of the supplemental tool to brace it in its work.

3. In a device of the class described, a main tool holder shank, a supplemental working tool carryable by said main tool shank, means pivoting the supplemental tool at a point to one side of the longitudinal center of the main tool shank, and a tool engageable bearing point on each side of the tool shank at different distances along the length of the shank and at approximately equal distances from the pivotal point of the supplemental tool adapted to be selectively engaged by the side of the supplemental tool to brace it in its work.

4. In a device of the class described, a main tool holder shank, a supplemental working tool carryable by said main tool shank, means pivoting the supplemental tool at a point to one side of the longitudinal center of the main tool shank, a plurality of tool engageable bearing points irregularly positioned on the main tool shank adapted to be selectively engaged by the side of the supplemental tool to brace it in its work, and means for detachably clamping the supplemental tool in position engaging a selected one of said bearing points.

5. In a device of the class described, a main tool holder shank, a supplemental working tool carryable by said main tool shank, means pivoting the supplemental tool at a point to one side of the longitudinal center of the main tool shank, and a tool engageable bearing point on each side of the tool shank at different distances along the length of the shank adapted to be selectively engaged by the side of the supplemental tool to brace it in its work, and means for detachably clamping the supplemental tool in position engaging a selected one of said bearing points.

6. In a device of the class described, a main tool holder shank, a supplemental working tool carryable by said main tool shank, means pivoting the supplemental tool at a point to one side of the longitudinal center of the main tool shank, a tool engageable bearing point on each side of the tool shank at different distances along the length of the shank and at approximately equal distances from the pivotal point of the supplemental tool adapted to be selectively engaged by the side of the supplemental tool to brace it in its work, and means for detachably clamping the supplemental tool in position engaging a selected one of said bearing points.

7. In a device of the class described, a main tool holder shank, a supplemental working tool having a shank of substantial length, a rotatable tool holding head, means pivoting said head at a point to one side of the longitudinal center of the main tool holder shank, means detachably securing the shank of the supplemental working tool to the head at one side of the pivotal center of the head, and a plurality of tool engageable bearing points irregularly positioned on the main tool shank adapted to be selectively engaged by the side of the shank of the supplemental tool to brace it in its work.

8. In a device of the class described, a main tool holder shank, a supplemental working tool having a shank of substantial length, a rotatable tool holding head, means pivoting said head at a point to one side of the longitudinal center of the main tool holder shank, means detachably securing the shank of the supplemental working tool to the head at one side of the pivotal center of the head, and a tool engageable bearing point on each side of the tool shank at different distances along the length of the shank adapted to be selectively engaged by the side of the shank of the supplemental tool to brace it in its work.

9. In a device of the class described, a main tool holder shank, a supplemental working tool having a shank of substantial length, a rotatable tool holding head, means pivoting said head at a point to one side of the longitudinal center of the main tool holder shank, means detachably securing the shank of the supplemental working tool to the head at one side of the pivotal center of the head, and a tool engageable bearing point on each side of the tool shank at different distances along the length of the shank and at approximately equal distances from the pivotal point of the supplemental tool adapted to be selectively engaged by the side of the shank of the supplemental tool to brace it in its work.

In witness whereof, I have hereunto subscribed my name in the presence of two witnesses.

WILLIAM J. DORRANS.

Witnesses:
T. H. JOHNSTON,
B. F. JEFFERSON.